Nov. 5, 1968

O. E. ALBERTSON 3,409,545

WASTE TREATMENT PROCESS AND PROCESS AND
APPARATUS FOR RECOVERING LIME

Filed Sept. 12, 1967

INVENTOR.
ORRIS E. ALBERTSON
BY Arnold Grant
ATTORNEY.

3,409,545
WASTE TREATMENT PROCESS AND PROCESS
AND APPARATUS FOR RECOVERING LIME
Orris E. Albertson, Norwalk, Conn., assignor to Dorr-Oliver Incorporated, Stamford, Conn., a corporation of Delaware
Continuation-in-part of application Ser. No. 570,017 Aug. 3, 1966. This application Sept. 12, 1967, Ser. No. 667,097
26 Claims. (Cl. 210—5)

ABSTRACT OF THE DISCLOSURE

A process for decreasing the phosphorous and nitrogen content of organic waste material comprising mixing the waste with a chemical precipitant; settling and removing precipitated phosphorous bearing solids; stripping the ammonia; aerating the effluent to biologically remove phosphorous and settling and removing precipitated phosphorous bearing solids. The solids from the first sedimentation are then thermally oxidized in a reactor and the solids product of the reactor is run through a recovery system to recover reusable chemical precipitant for the first step.

---

This application is a continuation-in-part of a copending application, Ser. No. 570,017 filed Aug. 3, 1966.

A fundamental problem in stream pollution analyses is the accurate prediction of the effects of domestic and industrial waste discharge upon receiving waters. In the past the greatest emphasis has been given to the effects of organic waste material upon the oxygen resources of the stream. However, the oxygen yardstick of the BOD concept, although frequently useful, cannot satisfactorily account for a substantial portion of the pollutional potential of domestic and industrial waste. In recent years there has been a gradual shift in stress, apart from BOD, toward abating excessive biological enrichment, and the consequential prolific growths of algae, in receiving waters. Excessive algae growths are becoming a major concern in an increasing number of areas because of the aesthetic deterioration of the surface waters; because scums of algae discolor the water and release putrescent odors as they decompose; and, because algae clogs purification filters, thereby reducing the time factor in filter runs. In addition to this productivity response to fertilization, severe secondary pollution can result from the oxygen requirements associated with the ultimate decomposition of the organic material built up by the algae.

It has been recognized for some time that ordinary domestic sewage, especially its phosphorous content, is a rich source of the nutrients required by algae for sustained growth. Phosphorous removal, therefore, offers a practical and effective way of controlling algae growth in natural waters.

Heretofore, extraction of phosphorous from the incoming sewage was done primarily in a chemical, tertiary treatment system, most often by uneconomical, massive dosages of a chemical precipitant for phosphates such as calcium oxide, alum or iron salts.

Applicant's above identified copending, application addressed itself to this problem and approached it through a complementary chemical and biological process which significantly reduces both the soluble ortho-phosphate compounds and the suspended organic phosphates of organic waste material in a primary treatment step. The process is founded on the discovery of the relationship between chemical and biological removal of phosphorous. Simply stated it is that the curve of chemical dosage versus phosphate remaining is monomolecular in shape, and thus, it requires an increasingly large chemical dosage per milligram per liter of phosphorous to be removed as the concentration of phosphorous decreases. On the other hand, the rate of biological phosphorous removed is proportional to the rate and quantity of cell synthesis, and, provided there is enough phosphorous remaining for cell growth, is not a function of the phosphorous concentration.

Basically, the process entails chemically dosing the incoming organic waste material with enough lime in a clarifier and/or flocculator to coagulate and precipitate that part of the phosphorous which is most efficiently removed by chemical treatment, leaving the remaining portion to be removed by biological growth. The resulting sludge, containing the insoluble calcium phosphate, is cycled, through a small reaerator or mixer, back to the clarifier and/or flocculator to assure complete utilization of the lime and maximize the intended phosphorous removal. After a relatively short detention time, approximately 75–90% of the suspended solids, which includes 60–70% of the BOD, have been precipitated in the clarifier and/or flocculator and the clarified effluent is passed onto the biological treatment stage. At this point, the process becomes an activated sludge system, i.e., oxygen is bubbled through the effluent in a main aerator to convert the carbon, hydrogen, sulfur and nitrogen compounds from their reduced level to a more oxidized level. This oxidation, to remove the remaining BOD, is performed by micro-organisms which, in turn, absorb energy from these reactions for the synthesis of new cellulose protoplasm. It is these biological cells which metabolically "consume" the remaining phosphorous content of the effluent withdrawing it from the solution, to generate and sustain cell growth. The rate of nutrient removal, i.e., phosphorous precipitation, is generally a function of the cell tissue synthesis; and, as stated above, as long as there is sufficient phosphorous in the solution to sustain cell growth then the metabolic removal of the phosphorous will proceed independently of the concentration of phosphorous.

The aerated product is then transferred to a second clarifier to settle the newly formed sludge and for the subsequent discharge of the clarified, reduced-phosphorous content, effluent to the receiving waters. About 90% of the clarifier sludge is recycled back to the main aerator to maximize biological activity of the sludge, with the remaining 10% being channeled, through the reaerator or mixing station, back to the chemical treatment stage. Sludge buildup in this system is prevented by continuously removing to waste, a part of the recycle stream.

Experimental data derived from operation of the process has disclosed that between 80 and 90% of the original phosphorous content is removed from the final effluent. Further analysis has revealed, however, that the nitrogen in the discharge effluent present in the form of ammonium ions, will act as a catalyst to maintain continued algae growth even at greatly reduced phosphorous concentrations. Thus, final solution of the problem is dependent on the total elimination of all sustaining sources for the algae. To this end, applicant has devised an improvement to his above mentioned process which not only accomplishes the objective of nitrogen removal but also increases the degree of phosphorous removal to the 100% range. The improved process incorporates an increased pH value in the chemical treatment station and an air stripping tower intermediate the chemical and biological treatment stations to bubble off dissociated ammonium ions as ammonia gas. The cost of the additional lime added to increase the pH in the chemical treatment station to the level at which the ammonium ions will dissociate from its chemical compounds is more than compensated for by the elimination of substantially all of the phosphorous and nitrogen from the discharge effluent.

Although this system has numerous and distinct advantages over tertiary treatment for algae nutrient removal, most notably, much less lime is needed; the increased precipitation, 75–90% of the suspended solids including 60–70% of the BOD, in the primary treatment step means that a smaller main aerator can be used; there is considerably less solids product with primary treatment than would result in tertiary treatment; the investment in equipment is proportionally less; correspondingly, the cost per treated gallon is considerably less; and, substantially all of the phosphorous and nitrogen are removed, applicant has set about to still further improve upon his process by generating the relatively expensive chemical precipitant from the process by-products. The products of this system are the final effluent which is discharged to the receiving waters and a mixture of organic sludge and waste lime mud, the majority of which, depending upon the composition of the incoming feed sewage, is in the form of calcium carbonate.

It is therefore another object of the present invention to enhance the economics of applicant's nutrients removal process by extracting the lime required for the process from the waste sludge by-product. More particularly it is another object of the present invention to concurrently combust the organic waste sludge and calcine the lime mud content thereof and to separate the resultant lime from the inert ash.

A series of tests by applicant have demonstrated that the lime required for the process can be generated from the waste lime mud for less money than it cost to purchase calcium oxide. The chemical and physical properties of the sludge resulting from this process are such that it is readily dewatered to 30–50% solids, and it therefore costs less to prepare the sludge for further treatment and less fuel is required to combust it. Since the waste sludge must be disposed of, the added advantage of generating the most expensive raw material used in the process and disposing of an unwanted by-product in the same unit significantly reduces the capital investment required for the system. In addition, with applicant's improved process the increased pH of the liquor in the chemical treatment station softens the water, which precipitates still more calcium carbonate so that it is possible to recover more lime from the total system than was originally introduced.

According to a first aspect of the present invention there is provided a process for decreasing the nutrient content of organic waste material to a predetermined level comprising the steps of dosing the raw waste material with a chemical which precipitates phosphorous and raises the pH to a level sufficient to dissociate ammonium ions from their chemical compounds; subjecting the dosed waste material to a first sedimentation to settle at least a portion of the phosphorous content; transferring the effluent of the first sedimentation to a second zone and discharging the ammonium ions dissociated by the increased pH as ammonia gas; aerating the effluent of the first zone in a third zone to produce phosphorous consuming cell growth; and, subjecting the aerated effluent to a second sedimentation to remove the phosphorous bearing biological sludge and produce a final effluent of the predetermined nutrient content.

According to a second aspect of the present invention there is provided a process for extracting lime from a mixture of organic waste material and lime mud, comprising the steps of thermally oxidizing the mixture in a thermal reactor to form calcium oxide and ash; elutriating the calcium oxide and at least a portion of the ash by the spent reaction gases and transferring the elutriated calcium oxide and ash out of the reactor; separating the solid particles from the reaction gases; slaking the solid particles with water; and, separating the ash from the slaked calcium oxide. Elutriating of the calcium oxide and ash as herein used shall mean the separation and transfer of calcium oxide and ash from the mixture being thermally reacted, by the spent reaction gases.

According to a still further aspect of the present invention there is provided a process for decreasing the phosphorous content of organic waste material to a predetermined level comprising, dosing the organic waste material with a predetermined amount of a chemical precipitant for phosphorous; subjecting the dosed waste material to a first sedimentation to settle at least a portion of the phosphorous content; aerating the effluent of the first sedimentation in a first aeration zone to produce phosphorous consuming cell growth; subjecting the aerated effluent to a second sedimentation to remove the phosphorous bearing biological sludge and produce a final effluent of the predetermined phosphorous level; thermally oxidizing at least a portion of the solid product of said first sedimentation to form ash and the chemical precipitant for phosphorous; separating the ash from the chemical precipitant; and, utilizing the chemical precipitant to dose the organic waste material.

The subject matter which applicant regards as his invention is particularly pointed out and distinctly claimed in the concluding portion of this specification. The invention, however, as to its organization and method of operation together with further objects and advantages thereof will best be understood by reference to the following description taken in conjunction with the accompanying drawings in which:

Figure 1:
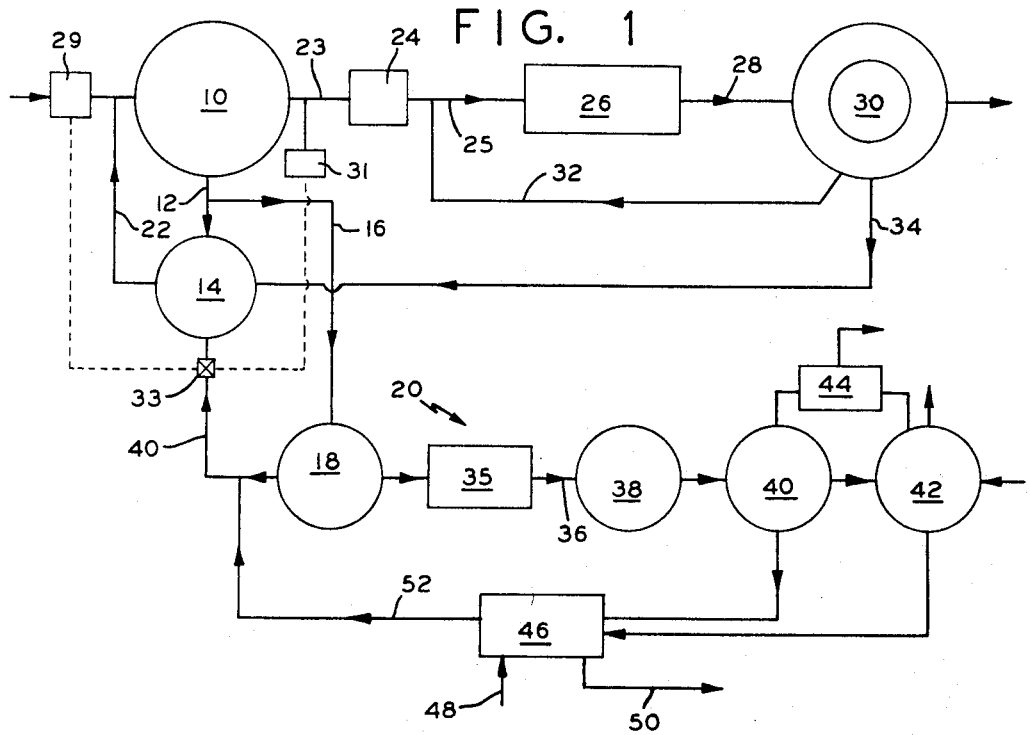
FIGURE 1 is a diagrammatic representation of a flow sheet for applicant's phosphate removal process incorporating the present invention.

Referring now to FIGURE 1, untreated organic waste or sewage is introduced to a clarification-flocculation system, diagrammatically depicted by station 10, and dosed with a predetermined quantity of a chemical precipitant for phosphorous, in this particular example lime, from a source to be described in greater detail below. Applicant's phosphorous removal process is based on the twofold discovery that, first, the curve of chemical dosage versus phosphate remaining in solution is monomolecular in shape and thus the chemical dosage must exponentially increase per milligram per liter of phosphorous to be removed as the concentration of phosphorous decreases; and second, that the rate of biological phosphorous removal, i.e., metabolic removal for cell growth, is linearly proportional to the rate of cell synthesis which, provided there is a sufficiency of phosphorous for cell growth, is not a function of the phosphorous concentration. Heretofore, control of phosphorous in the final effluent has been done primarily in a chemical, tertiary treatment system, most often through noneconomical addition of calcium oxide, alum or iron salts; with very little advance being made in the direction of biological treatment. Applicant, however, recognized the above mentioned relationship between chemical and biological removal of phosphorous and, as a result, his system incorporates a complementary process of both chemical dosing and metabolic biological removal.

Thus, enough chemical precipitant for phosphorous is added to precipitate and coagulate that part of the phosphorous which is most efficiently removed by chemical treatment leaving the remaining portion to be removed by biological action. In applicant's above identified copending application the optimum mix between chemical and biological phosphorous removal was found at a pH of between 8 and 9. However, in the improved process, to be described in greater detail hereinbelow, the pH of the liquor must be raised to the range of 10–11, i.e., high enough to dissociate the ammonium ions from their chemical compounds.

The mechanisms of phosphate removal by chemical coagulation are not too well understood. It is theorized, however, that the phosphorous is removed as an insoluble salt and/or by absorption upon some insoluble solid phase. In the case of lime coagulation it appears that the principal mechanism is that of precipitation as insoluble calcium phosphate salts. The increased pH, the optimum range being 10.3–10.5, has a twofold effect. First, it increases the amount of precipitated solids, removing a larger quantity of phosphorous from solution. Secondly, it softens the water; and thus, depending upon the hardness of the water and the exact operating pH, will precipitate some of the calcium salts associated with the water. Lime has an added advantage in that it is a flocculant and will thus increase the formation of sludge by non-phosphorous solids in the organic waste material which correspondingly removes a considerable amount of BOD from the system.

Sludge, i.e., the solid product from the clarification-flocculation station 10, is transferred either through conduit 12 to a small aeration or mixing tank 14 or through conduit 16 to a thickener 18 and the regenerating system 20, to be described in greater detail below. Empirical studies by applicant have shown that circulation of the retained sludge through a small aeration or mixing tank increases operating efficiency of the chemical treatment stage by as much as 40%. After aeration the sludge is recycled through conduit 22 back to station 10 to further increase flocculation and sedimentation and to maximize lime usage. The clarified effluent from station 10 is then passed, through conduit 23, to a nitrogen stripping tower 24 for discharge of the ammonia gas.

Stripping tower 24 will be described for the air operated type, although any conventional nitrogen stripping apparatus may be used. Air, from a source not shown, is introduced at the bottom of the tower to countercurrently bubble through the descending effluent and transform the ammonium ions to ammonia gas. The gases discharge at the top of the tower and the stripped liquid is transferred through conduit 25 to the main aeration tank 26 for biological treatment and removal of the remaining phosphorous.

Because of the chemical removal of 70–90% of the suspended solids including 60–70% of the BOD in the clarification-flocculation station, this aeration tank may be sized as much as 50% smaller than would otherwise be necessary and the horsepower required for generating the air may be correspondingly reduced, which is a considerable savings in capital investment and operating cost. At this point the system becomes an activated sludge process, i.e., the carbon, hydrogen, sulfur and nitrogen compounds in the effluent are oxidized by micro-organisms from their reduced level to a fully oxidized level, with the micro-organisms, or cells, absorbing energy from the oxidation reactions for the synthesis of new cellular protoplasm. This growth of existing cells and generating of new cells, in turn, metabolically consumes the remaining phosphorous content of the solution, with the rate of nutrient removal, i.e., phosphorous precipitation, being generally a function of cell tissue synthesis. As stated above the system will flourish regardless of the phosphorous concentration, provided, of course, that there is enough phosphorous in the solution to sustain cell growth.

After the phosphorous concentration has been reduced to a predetermined level and the BOD depleted the aerator product is transferred through conduit 28 to clarifier 30. A major portion of the sludge from this clarifier, approximately 90%, is recycled back to the aeration tank 26, through conduit 32, to load the aeration tank with biologically active sludge. The remaining 10% of the sludge is channeled through conduit 34 to the chemical treatment stage to further enhance removal of BOD. Applicant has found that a rapid sludge removal type clarifier is optimum for this stage of the system because it maintains maximum biological activity of the sludge and thus reduces the amount of lime required.

Figure 3:
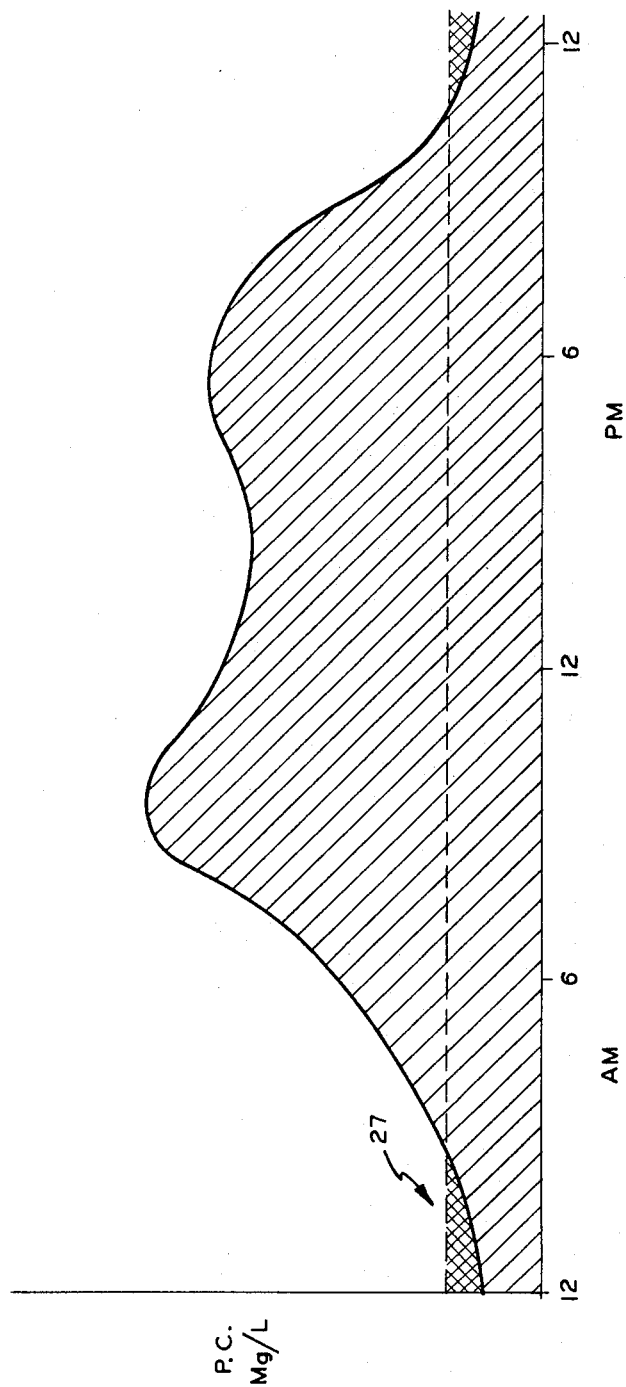
FIGURE 3 graphically depicts on a time basis one of the control features of applicant's improved process.

It is well known in the art that the volume flowing to the treatment plant will vary greatly during any 24 hour period. In a similar manner the phosphorous content and the alkalinity of the influent will also vary on a time basis. Applicant's process is based on the discovery of the monomolecular shape of the curve of chemical dosage versus phosphate removal, i.e., the less phosphate remaining in solution the more precipitant required to remove it. Thus, at some times during an operating day the flow and/or the concentration of phosphorous in the flow militates against attempting to precipitate the phosphorous from solution. Applicant has taken this into consideration and has devised a control system to further enhance the economics of his process. As graphically portrayed in FIGURE 3, the abscissa representing time on a 24 hour basis and the ordinate representing the phosphorous concentration, or P.C., at any particular time, a line, delineated by numeral 27, is arbitrarily chosen at the point where phosphorous removal becomes economically attractive.

A phosphate analyzer 29 is positioned downstream in the influent feed pipe to monitor the flow of incoming waste material. As long as the concentration of phosphorous in the feed, measured in milligrams per liter, is above the predetermined level the system will operate as designed to remove all the phosphorous from the liquor. A pH meter 31 positioned along conduit 23, intermediate the clarifier-flocculator station 10 and the nitrogen stripping tower 24, monitors and controls the pH of the effluent by controlling the introduction of lime to the system. If the pH drops below the desired range, the meter activates a valve 33 and additional lime is fed to clarifier-flocculator station 10. If, on the other hand, the pH should increase, either, for example, because of a decrease in the phosphorous concentration or an increase in the alkalinity of the influent, then the pH meter will curtail the influx of lime by correspondingly reducing the opening in valve 33. Should, however, the phosphorous concentration fall below the predetermined level, i.e., the line depicted by numeral 27 then the phosphate analyzer will override the pH meter and completely shut down the introduction of lime to the system. Thus even though the operating parameters of the process have been determined it is still flexible enough to adjust to the constantly varying conditions and phosphate concentrations which may occur during an operating cycle.

As stated above a portion of the sludge from clarification-flocculation station 10 is continuously removed from the phosphate extraction system to the regeneration system 20. This sludge, which prevents solids build-up in the phosphate extraction system, is received in thickener 18 and dewatered in either a filter or a centrifuge 35 before it is introduced, through conduit 36, to thermal reactor 38 preferably a fluidized bed reactor of the general type disclosed in the patent to White 1,774,661. The effluent from the thickener 18 may be either wasted or returned to the phosphorous process through conduit 39. The sludge in conduit 36 is a mixture of organic waste material and lime mud, the majority of which, depending upon the composition of the incoming feed sewage, is in the form of calcium phosphate and calcium carbonate. Oxygen, preferably in the form of air, is concurrently introduced with the sludge mixture to the thermal reactor to combust the organic waste material to ash and to calcine the calcium carbonate component of the lime mud to calcium oxide and carbon dioxide. Heat for these reactions is supplied directly from the oxidation of the organic waste material.

In applicant's first embodiment of his lime recovery system, as shown in FIGURE 1, the lime along with part of the ash is elutriated from the reactor by the spent reaction gases and transferred into a gas cyclone 40. The bases are stripped by the cyclone and the solid particles report, as underflow to a slake tank 42; a scrubber 44 may be used to complete the solids-gas recovery process. At this juncture two alternative approaches are possible. Either the calcium oxide can be slaked to a milk of lime slurry, or the calcium oxide can be diluted, by additional water, to a calcium hydroxide solution. The ash particles can be readily separated from a calcium hydroxide solution either by clarification, decantation or cycloning, each representatively depicted by station 46. With a milk of lime slurry, on the other hand, there is a range of size overlap between the ash and the calcium oxide-calcium hydroxide particles. Thus either some ash must be recirculated back into the phosphorous extraction system, as will presently be explained, or some of the lime must be wasted and additional lime introduced to the system, as through conduit 48, to supply the difference. Whichever course is chosen, the ash is discharged to waste through conduit 50 and the lime is transferred through conduit 52 into conduit 40 and thus back into the phosphorous extraction system. This lime is thoroughly mixed with the feed sludge in aerator or mixer 14 and then introduced along with the incoming feed to clarification-flocculation station 10 for the chemical removal of the phosphorous.

Figure 2:
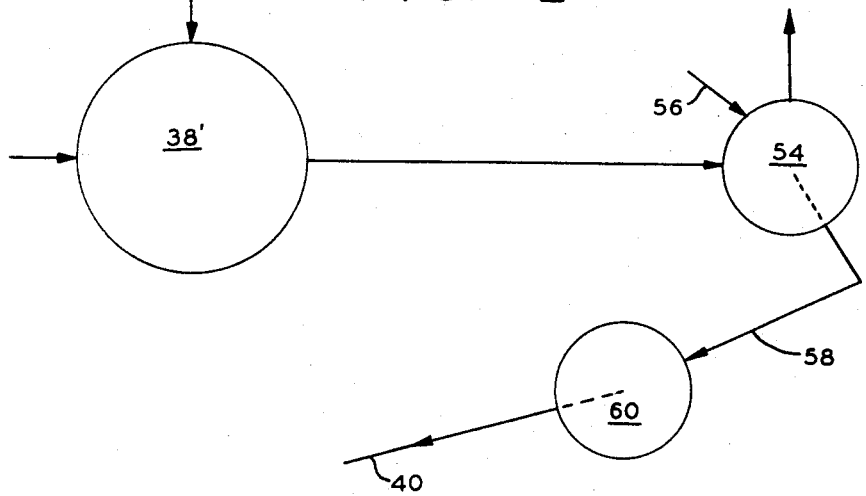
FIGURE 2 is a diagrammatic representation of a modification of the present invention.

In applicant's second embodiment of his lime recovery system, representatively depicted in FIGURE 2, the elutriated calcines and ash from thermal reactor 38' are transferred directly to a wet venturi-type scrubber 54. Water, introduced through conduit 56 concurrently strips the solid particles from the gases and slakes the calcium oxide. At this point the resulting milk of lime slurry can either be diluted to a calcium hydroxide solution or the ash particles can be separated from the slurry in its suspension state. In either case the slurry is transferred from the scrubber through conduit 58 to a dilution-separation station, e.g., a dilution tank and a cyclone, or a separation station, e.g., a cyclone, both representatively depicted by numeral 60, to remove the ash component. The resultant lime slurry, is, as above, then transferred through conduits 52 and 40 into the phosphate extraction system.

As this invention may be embodied in several forms without departing from the spirit or essential character thereof, the present embodiments are illustrative and not restrictive. The scope of the invention is defined by the appended claims rather than by the description preceding them and all embodiments which fall within the meaning and equivalency of the claims are therefore intended to be embraced by those claims.

I claim:

1. A process for extracting lime from a mixture of organic waste material and lime mud comprising:
   (a) thermally oxidizing the mixture in a thermal reaction zone at sufficient temperatures to form calcium oxide and ash;
   (b) elutriating the calcium oxide and at least a portion of the ash by the spent reaction gases and transferring the elutriated calcium oxide and ash out of the reaction zone;
   (c) separating the transferred calcium oxide and ash from the reaction gases in a first separating zone;
   (d) slaking the transferred calcium oxide and ash with water; and,
   (e) separating the ash from the slaked calcium oxide in a second separating zone.

2. A process for extracting lime from a mixture of organic waste material and lime mud as defined in claim 1 wherein said first separating zone is a gas cyclone.

3. A process for extracting lime from a mixture of organic waste material and lime mud as defined in claim 2 wherein said thermal reaction zone is a fluidized bed reactor.

4. A process for extracting lime from a mixture of organic waste material and lime mud as defined in claim 2 wherein the product of said first separating zone is slaked to a slurry and said second separating zone is a cyclone.

5. A process for extracting lime from a mixture of organic waste material and lime mud as defined in claim 2 wherein the product of said first separating zone is slaked at least to the solubility point of calcium hydroxide in water.

6. A process for extracting lime from a mixture of organic waste material and lime mud comprising:
   (a) thermally reacting the mixture in a first zone to form calcium oxide and ash;
   (b) elutriating the calcium oxide and at least a portion of the ash by the spent reaction gases and transferring the elutriated calcium oxide and ash out of the reaction zone;
   (c) concurrently separating the transferred calcium oxide and ash from the spent reaction gases and dosing the transferred calcium oxide and ash with a solvent in a second zone; and,
   (d) separating the ash from the slaked calcium oxide in a third zone.

7. A process for extracting lime from a mixture of organic waste material and lime mud as defined in claim 6 wherein said second zone is a wet venturi-type scrubber and said solvent is water.

8. A process for decreasing the phosphorous content of organic waste material to a predetermined level comprising:
   (a) dosing the organic waste material with a predetermined amount of a chemical precipitant for phosphorous;
   (b) subjecting the dosed waste material to a first sedimentation to settle at least a portion of the phosphorous content;
   (c) aerating the effluent of the first sedimentation in a first aeration zone to produce phosphorous consuming cell growth;
   (d) subjecting the aerated effluent to a second sedimentation to remove the phosphorous bearing biological sludge and produce a final effluent of the predetermined phosphorous level;
   (e) thermally oxidizing at least a portion of the solid product of said first sedimentation to form ash and the chemical precipitant for phosphorous;
   (f) separating the ash from the chemical precipitant; and,
   (g) utilizing the chemical precipitant to dose the organic waste material.

9. A process as defined in claim 8 further including the step of dosing the chemical precipitant for phosphorous and at least a portion of the ash with water prior to the separation of the ash from the chemical precipitant.

10. A process as defined in claim 8 further comprising the steps of continuously monitoring the influent organic waste material to determine the phosphorous concentration thereof and maintaining the flow of the chemical precipitant for phosphorous to the influent organic waste material as long as the phosphorous concentration is above a predetermined level.

11. A process as defined in claim 8 further comprising the step of controllably maintaining with a pH meter the amount of chemical precipitant for phosphorous mixed with the organic waste material.

12. A process as defined in claim 8 wherein the thermal oxidation is performed in a first thermal reaction zone and the chemical precipitant for phosphorous and at least a portion of the ash formed in the zone are removed therefrom by being elutriated in the spent reaction gases.

13. A process as defined in claim 12 wherein the chemical precipitant for phosphorous and the ash are carried by the spent reaction gases to a second zone where the solid particles are stripped from the gases and dosed with a solvent.

14. A process as defined in claim 12 wherein the chemical precipitant for phosphorous and the ash are carried by the spent reaction gases to a second zone where the solid particles are stripped from the gases; and further including the steps of transferring the separated solid particles to a third means and dosing the particles in said third means with water prior to the separation of the ash from the chemical precipitant.

15. A process as defined in claim 12 wherein the chemical precipitant for phosphorous is lime.

16. A process as defined in claim 8 wherein the chemical precipitant for phosphorous is lime.

17. A process as defined in claim 16 further including the steps of recirculating at least a part of the solid product of said first sedimentation back into the first sedimentation and cycling at least a part of the phosphorous bearing biological sludge from said second sedimentation back into the first sedimentation.

18. A process as defined in claim 17 wherein at least a portion of the phosphorous bearing biological sludge from said second sedimentation is recycled to the first aeration zone.

19. A process as defined in claim 8 wherein the organic waste material is dosed with the chemical precipitant for phosphorous to a pH sufficient to dissociate ammonium ions from their chemical compounds.

20. A process as defined in claim 19 wherein the organic waste material is dosed with the chemical precipitant for phosphorous to a pH of between 10 and 11 and the effluent from said first sedimentation is transferred to an intermediate zone between the first sedimentation and the first aeration zone to discharge the dissociated ammonium ions as ammonia gas.

21. A process for decreasing the nutrient content of organic waste material to a predetermined level comprising the steps of:
(a) dosing the raw waste material with a chemical which precipitates phosphorous and raises the pH to a level sufficient to dissociate ammonium ions from their chemical compounds;
(b) subjecting the dosed waste material to a first sedimentation to settle at least a portion of the phosphorous content;
(c) transferring the effluent of the first sedimentation to a second zone and discharging the ammonium ions dissociated by the increased pH as ammonia gas;
(d) aerating the effluent of the first zone in a third zone to produce phosphorous consuming cell growth; and,
(e) subjecting the aerated effluent to a second sedimentation to remove the phosphorous bearing biological sludge and produce a final effluent of the predetermined nutrient content.

22. A process as defined in claim 21 wherein the raw waste material is dosed to a pH of between 10–11.

23. A process as defined in claim 22 further comprising the step of continuously monitoring the incoming feed waste material to determine the phosphorous concentration thereof and maintaining the flow of the chemical dosant to the raw waste material as long as the phosphorous concentration of the raw waste material is above a predetermined level.

24. A process as defined in claim 22 further comprising the step of controllably maintaining with a pH meter the amount of chemical dosant mixed with the raw waste material.

25. Apparatus for recovering lime from a mixture of organic waste material and lime mud consisting of a thermal reactor operating at a temperature sufficient to form calcium oxide and ash from said mixture and produce spent reaction gases separating and transferring the calcium oxide and at least a part of the ash from said reactor to a separating zone, a solids from gas separator for separating the transferred calcium oxide and ash from the spent reaction gases, means for slaking the transferred calcium oxide and ash in water, and separating means for separating the ash from the slaked calcium oxide to thereby recover the lime from said waste material lime mud mixture.

26. The invention defined in claim 25, in which said reactor is of the fluidized bed type.

References Cited

UNITED STATES PATENTS

| | | | |
|---|---|---|---|
| 960,725 | 6/1910 | Snyder | 209—144 X |
| 1,541,337 | 6/1925 | Feix | 209—144 X |
| 2,072,154 | 3/1937 | Butterfield | 210—45 |
| 3,077,986 | 2/1963 | O'Neal et al. | 209—144 |
| 2,616,563 | 11/1952 | Hebb | 209—144 |
| 3,342,731 | 9/1967 | Baumann et al. | 210—45 |

OTHER REFERENCES

R. H. Bogan et al., Use of Algae in Removing Phosphorus from Sewage, Journal of the Sanitary Engineering Div., Proc. Am. Soc. of Civil Engineers, September 1960, SA 5, pp. 1–3 and 13–20 relied on.

MICHAEL E. ROGERS, *Primary Examiner.*